3,027,280
TREATMENT OF COMPLEX RESIDUE
Ralph William King, Altrincham, and David Joseph Movsovic, Timperley, England, assignors to Shell Oil Company, a corporation of Delaware
No Drawing. Filed Apr. 2, 1957, Ser. No. 650,083
Claims priority, application Great Britain Apr. 10, 1956
5 Claims. (Cl. 134—22)

This invention relates to the manufacture of aluminum alkyl compounds. More particularly, it relates to improved methods in the manufacture of aluminum alkyls resulting in increased efficiency and safety.

Aluminum alkyl compounds are widely used in the preparation of certain polymerization catalysts. Such aluminum compounds include aluminum trialkyls and aluminum dialkyl halides as, for example, aluminum trimethyl, aluminum triethyl, aluminum triisopropyl, aluminum diethyl chloride, aluminum diethyl bromide, and the like. These and similar aluminum alkyls are commonly prepared by the so-called "sodium dehalogenation method" which comprises reacting an aluminum alkyl sesquihalide with sodium. The quantity of the sodium that is reacted with the sesquihalide will determine whether the trialkyl or the dialkyl halide of aluminum is produced. In either case the reactions must be conducted with caution as highly flammable materials are involved which may ignite on contact with air. In conducting the sodium dehalogenation reactions a closed steel reactor is normally used with reaction temperatures ranging from about 120° C. to about 180° C. After the reaction is complete the aluminum alkyl is distilled under vacuum to recover it. After the distillation is complete a residue is found to be deposited on the walls of the reaction vessel. The residue is a hard, crusty material which comprises a product of sodium halide, finely divided aluminum and organo-aluminum compounds. The product is a pyrophoric material which is difficult to remove from the walls of the reactor and the treatment of the product for its removal has heretofore been attended with considerable fire risk.

Heretofore the residue was treated with a hydrocarbon oil to obtain a slurry of the residue. Thereafter the slurry was treated with a lower alcohol such as isopropanol or methanol. The added alcohol reacted violently with the evolution of heat and flammable vapors. Therefore, safety considerations required that the reaction vessel be transferred to an area in which no damage would result in case the vapors ignited. An alternative method for the removal of the residue was to treat it with a hydrocarbon oil in an atmosphere of inert gas, such as nitrogen, while adding a lower alcohol to decompose the residue. As the vapors formed they were removed through an external vent preferably through an intervening cooler. Because such residues are very compact it was most often necessary to further treat the residue in order to remove completely all of it. These prior art methods of removing the residue required about 12 hours of constant attention in addition to which it was required to transport the reaction vessel from its normal operating location to a location where the cleaning operation may be safely conducted. The prior art methods have the further disadvantage in that the amount of aluminum alkyls which can be safely and economically produced is limited.

It is an object of this invention to provide safe and efficient methods for the removal of the pyrophoric residue which remains from the preparation of aluminum alkyl compounds by the sodium dehalogenation of aluminum alkyl sesquihalides. It is another object of this invention to provide safe and improved methods for the removal of the pyrophoric residue which remains from the preparation of aluminum trialkyls and aluminum dialkyl halides. Other objects will become apparent as the description proceeds.

These and other objects are accomplished by treating a pyrophoric residue comprising a product of aluminum, sodium halide, and organo-aluminum compounds with an aqueous solution of a compound selected from the group consisting of alkali metal hydroxides, alkali metal salts of weak organic acids and alkali metal carbonates. Among the alkali metal hydroxides there may be mentioned sodium hydroxide, potassium hydroxide, lithium hydroxide, and the like. Other examples of suitable compounds which may be employed in the methods of this invention include alkali metal carbonates, bicarbonates, acetates, propionates, and the like. In the preferred embodiment of this invention an aqueous solution of an alkali metal hydroxide, or a compound of the type described above which will yield an alkali metal hydroxide, is used in a dilute solution in the order of about 3 to 10% by weight. It will be readily appreciated that greater concentrations may also be used but it is uneconomical to do so. Lower concentrations may be used but it will be found that somewhat longer times are required in order to complete the process. In most instances a concentration of about 5% by weight is found to be most suitable.

In conducting the processes of this invention the solution of the alkali metal hydroxide, or other compound of the type indicated, is fed into the reactor containing the pyrophoric residue while maintaining an atmosphere of an inert gas in the reaction vessel. The solution of the compound is introduced into the reaction vessel in any suitable form. Thus, for example, if desired, the reactor may be suitably equipped with a spray head which will permit the solution to be fed into the reactor in the form of a fine spray. This has the advantage that the initial contact of the solution with the residue will cause a less pronounced rise in temperature. Use of a spray head is not necessary as it will be found that the solution may be fed into the reactor in bulk. Irrespective of the method used to feed the solution into the reactor it is found to be desirable to apply cooling to the vessel as the initial contact of the solution and residue is vigorous but it quickly subsides after addition of minor portions of the solution. As the reaction proceeds, a gas is evolved which should be vented as it is formed. If desired, the vented gas may be passed through a cooler before being discharged into the atmosphere.

Because of the vigor of the initial reaction, it is desirable to add the solution to the reactor very slowly at first. That is to say that the initial addition of the aqueous solution should be added over a period of an hour or two.

Because the reaction generates its own heat it is unnecessary to apply external heating in order to carry out the processes of this invention. Actually heat may be applied if desired but it will be found that the judicious use of safety precautions requires that the processes of this invention be so conducted so as to minimize the danger which may result from conducting the process too rapidly. If desired the solution of the compound may be cooled to about 10° C. before it enters the reactor. Such a procedure, however, is unnecessary as the solution at about ambient temperature is found to be safe and satisfactory.

The invention will be better understood by making reference to the following examples wherein the quantities of the reactants are expressed in parts by weight.

*Example I*

To 40 parts of aluminum ethyl sesquichloride in a 7 gallon stainless steel reactor, 5 parts of metallic sodium is added with constant stirring. With external heating and cooling applied the reaction mixture is raised to 170° C. to 180° C. The temperature is then maintained at 180° C. for another hour with constant stirring. The sodium reacts primarily with the aluminum monoethyl chloride thus:

$$3Na + 2AlEtCl_2 \rightarrow AlEt_2Cl + 3NaCl + Al$$

The quantity of sodium employed is sufficient to convert all of the aluminum monoethyl dichloride according to the above equation, but some of the sodium chloride formed reacts with excess aluminum monoethyl dichloride forming the non-volatile product $NaCl \cdot AlC_2H_5Cl_2$. The reaction product in the reactor is then subjected to vacuum distillation, employing a pressure of 3 to 10 mm. Hg and finally heating the reactor to 160° C. at the end of the distillation. A quantity of 24 parts of pure aluminum diethyl monochloride is obtained as distillate leaving behind 21 parts of a reactive pyrophoric residue comprising sodium chloride, aluminum, the product $$NaCl \cdot AlC_2H_5Cl_2$$

and aluminum diethyl monochloride.

A 5% aqueous solution of sodium hydroxide is gradually sprayed onto the residue with the reactor closed which reactor is previously filled with nitrogen. The evolved gas is passed through a cooler to an external vent. Cooling water is circulated external to the reactor as the solution is added. The first ten parts of aqueous sodium hydroxide is added slowly over a period of about two hours. A further twenty parts of the aqueous solution is then added quite rapidly (½ hour or less) and the contents of the reactor stirred for about ½ hour and then discharged; after washing with water the reactor is very clean and ready for reuse. The total time taken for decomposition and cleaning was between 3 and 4 hours, with only occasional attention required by the operator.

*Example II*

In separate cleaning procedures as Example I, there is used aqueous solutions of 10% sodium propionate, 7% sodium carbonate, 5% potassium formate and 10% sodium bicarbonate, respectively. In all cases the reaction vessel is ready for reuse after about 4 hours.

*Example III*

The procedure of Example I is repeated except the aluminum triethyl is prepared using about twice the amount of metallic sodium. Thereafter the cleaning procedure is repeated to obtain a clean reaction vessel in less than four hours.

*Example IV*

Following the method described in Example I, aluminum diethyl bromide is prepared from aluminum ethyl sesquibromide. The residue is treated as in Example I to obtain the same satisfactory result.

*Example V*

The procedure of Example I is repeated using aluminum ethyl sesquifluoride to produce aluminum diethyl fluoride. The residue is removed in the same manner in about four hours.

*Example VI*

In a manner similar to that of Example III aluminum triisobutyl is prepared and the residue is removed using a 10% solution of calcium butyrate. About five hours are required which may be attributed to the lower activity of the salt.

*Example VII*

This example illustrates and compares prior art methods as described above.

To a reaction vessel containing a pyrophoric residue obtained by the procedure of Example I is added 12 parts of gas oil while the reactor is warm. The oil is allowed to stand in contact with the residue for a few hours in order for the oil to penetrate the residue. The reactor is then moved outside the building and isopropyl alcohol is added in small quantities. A vigorous reaction occurs. After the reaction subsides, the residue is loosened with a long metal rod whereupon a further vigorous reaction occurs. The long rod is again used to loosen the residue and an additional reaction occurs. This procedure is repeated several times until as much of the residue as possible has been decomposed whereupon the contents of the vessel are discharged onto the ground and a fresh quantity of isopropyl alcohol is added to the vessel whereupon the remaining residue is decomposed. In all, 40 to 50 parts of isopropyl alcohol is consumed with fires frequently occurring both in the reactor and while discharging the contents thereof. There is required about 12 hours before the vessel is ready for reuse with 8 hours of this time requiring the constant attention of the operator.

From the foregoing description it will be apparent that this invention is directed to removal of a pyrophoric residue comprising a product of sodium halide, aluminum and organo-aluminum compounds which residue may be obtained from the sodium dehalogenation of aluminum alkyl sesquihalides. It will further be seen that this invention has been described in the several preferred embodiments which are directed first to safe methods of operation then to efficient methods of operations. It will be understood therefore that the methods of this invention can be speeded up by various means such as increasing the concentrations and rates of addition of the solutions, operating at elevated temperatures, and the like. Such modifications are undertaken at the risk of decreasing the safety margin. Conversely, lower concentrations, rates and temperatures will increase the safety factor but will require longer processing times. The above description represents those conditions which are believed to be both safe and efficient although departure therefrom may be undertaken without departing from the spirit of this invention.

We claim as our invention:

1. The process of removing adherent deposits from surfaces which deposits result from the sodium dehalogenation of aluminum alkyl sesquihalide which comprises contacting the deposits with an aqueous solution of a compound selected from the group consisting of alkali metal hydroxide, alkali metal salts of organic acids, and alkali metal carbonates.

2. The process of claim 1 in which the said compound is sodium hydroxide.

3. The process of claim 1 in which the said compound is potassium hydroxide.

4. The process of claim 1 in which the said compound is sodium bicarbonate.

5. The process of claim 1 in which the aqueous solution is 3 to 10%, by weight.

References Cited in the file of this patent

UNITED STATES PATENTS

| | | |
|---|---|---|
| 1,049,054 | Coombs | Dec. 31, 1912 |
| 2,516,008 | Lum | July 18, 1950 |
| 2,632,718 | Brodell | Mar. 24, 1953 |
| 2,720,457 | Schaufelberger et al. | Oct. 11, 1955 |
| 2,810,665 | Szayna | Oct. 22, 1957 |

FOREIGN PATENTS

| | | |
|---|---|---|
| 828,466 | Germany | Jan. 17, 1952 |